United States Patent
Yoo et al.

(10) Patent No.: US 9,794,004 B2
(45) Date of Patent: Oct. 17, 2017

(54) SIGNALING TO ENABLE SERVING CELL INTERFERENCE SUPPRESSION

(71) Applicant: QUALCOMM Incorporated, San Diego, CA (US)

(72) Inventors: Taesang Yoo, San Diego, CA (US); Tao Luo, San Diego, CA (US); Yongbin Wei, San Diego, CA (US)

(*) Notice: Subject to any disclaimer, the term of this patent is extended or adjusted under 35 U.S.C. 154(b) by 147 days.

(21) Appl. No.: 14/476,476

(22) Filed: Sep. 3, 2014

(65) Prior Publication Data
US 2015/0131573 A1 May 14, 2015

Related U.S. Application Data

(60) Provisional application No. 61/902,077, filed on Nov. 8, 2013.

(51) Int. Cl.
| | | |
|---|---|---|
| H04B 15/00 | (2006.01) | |
| H04L 5/00 | (2006.01) | |
| H04W 24/02 | (2009.01) | |
| H04W 72/12 | (2009.01) | |

(52) U.S. Cl.
CPC .............. *H04B 15/00* (2013.01); *H04L 5/003* (2013.01); *H04W 24/02* (2013.01); *H04W 72/1226* (2013.01)

(58) Field of Classification Search
None
See application file for complete search history.

(56) References Cited

U.S. PATENT DOCUMENTS

| | | | |
|---|---|---|---|
| 2007/0217530 A1* | 9/2007 | Hosseinian | H04L 25/0234 375/260 |
| 2010/0309861 A1* | 12/2010 | Gorokhov | H04B 1/7103 370/329 |
| 2012/0281683 A1* | 11/2012 | Falconetti | H04J 11/0023 370/336 |
| 2013/0077578 A1 | 3/2013 | Wang et al. | |
| 2013/0083753 A1* | 4/2013 | Lee | H04W 72/0453 370/329 |
| 2013/0196700 A1* | 8/2013 | Tiirola | H04J 11/0043 455/501 |

(Continued)

FOREIGN PATENT DOCUMENTS

EP    2508033 A1    10/2012

OTHER PUBLICATIONS

International Search Report and Written Opinion—PCT/US2014/054005—ISA/EPO—Dec. 9, 2014.

*Primary Examiner* — Awet Haile
(74) *Attorney, Agent, or Firm* — Arent Fox, LLP

(57) ABSTRACT

Suppression of serving cell transmissions directed to second-served UEs may improve channel estimation of a serving cell or a neighbor cell. This may include using scheduling information for second-served UEs to suppress serving cell signals intended for second-served UEs having overlapping MIMO transmissions. Alternatively, this scheduling information may aid in suppressing a serving cell signal for a second-served UE to improve channel estimation of a neighbor cell. Various embodiments described herein, include implementations and techniques to aid channel estimation, and signal scheduling information to a first-served UE to aid in suppression of serving cell signals for second-served UEs.

22 Claims, 11 Drawing Sheets

(56) References Cited

U.S. PATENT DOCUMENTS

2014/0233466 A1* 8/2014 Pourahmadi .......... H04L 5/0051
370/329
2015/0029958 A1* 1/2015 Park ..................... H04L 5/0053
370/329

* cited by examiner

SIGNALING TO ENABLE SERVING CELL INTERFERENCE SUPPRESSION

CROSS-REFERENCE TO RELATED APPLICATION(S)

This application claims the benefit of U.S. Provisional Application Ser. No. 61/902,077, entitled "Signaling to Enable Serving Cell Interference Cancellation" and filed on Nov. 8, 2013, which is expressly incorporated by reference herein in its entirety.

BACKGROUND

Field

The present disclosure relates generally to communication systems, and more particularly, to signaling to enable serving cell interference suppression or cancellation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Suppression of serving cell transmissions may improve channel estimation of a serving cell or neighbor cell. This may include using scheduling information for second-served UEs to suppress received serving cell signals intended for second-served UEs having overlapping MIMO transmissions. Alternatively, this scheduling information may aid in suppressing received non-overlapping serving cell signals for second-served UE to improve channel estimation of a neighbor cell.

In an aspect of the disclosure, a method, a computer program product, and an apparatus are provided. The apparatus, e.g., a first-served UE, receives scheduling information for a serving cell serving the apparatus. The scheduling information is for at least one second-served UE served by the serving cell. The apparatus receives a signal, the received signal includes a first signal intended for the apparatus and a second signal intended for the at least one second-served UE. The apparatus suppresses interference by the second signal during channel estimation of a neighboring cell. The interference suppression is based on the received scheduling information.

DETAILED DESCRIPTION

Figure 1:
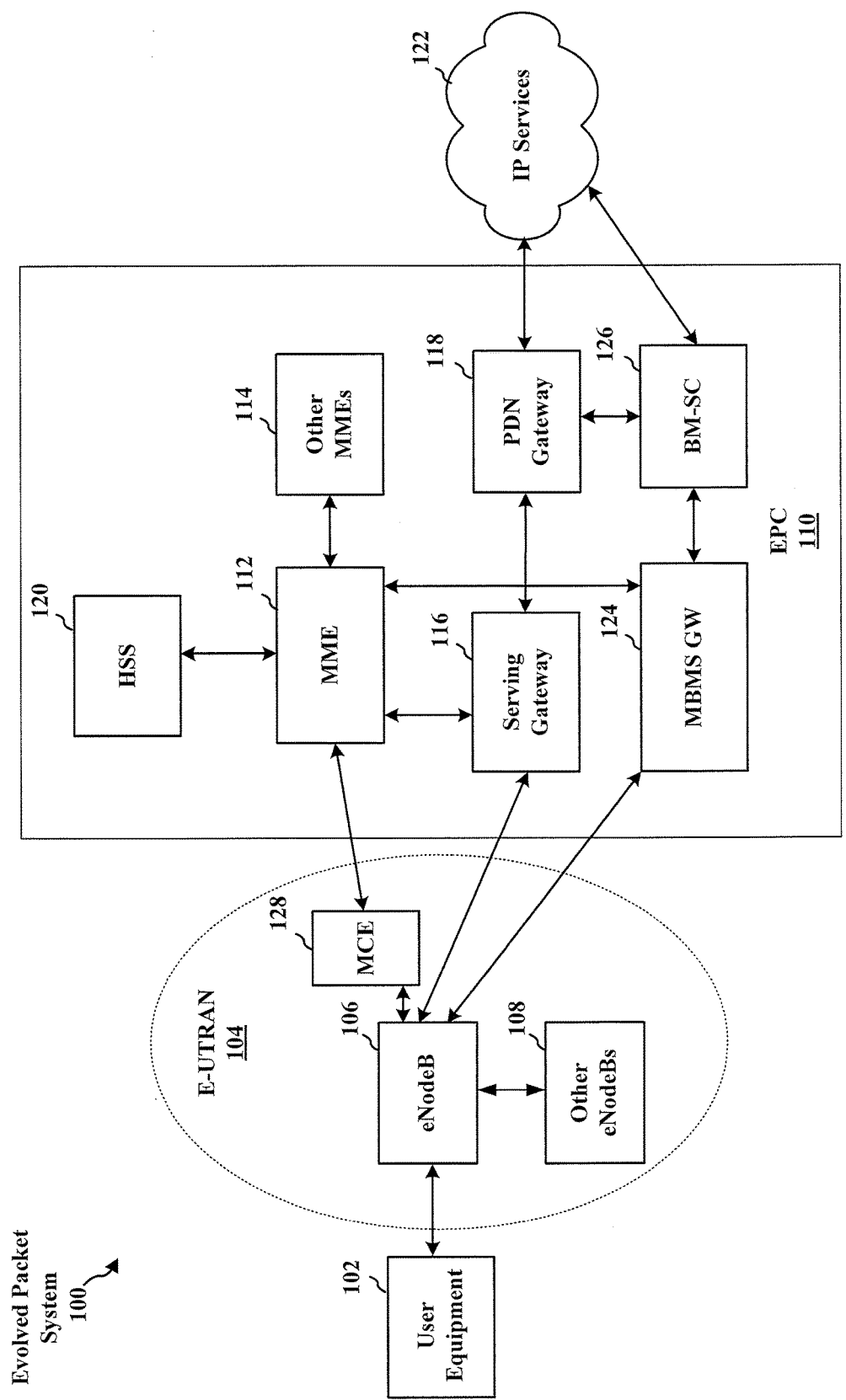
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106, other eNBs 108, and a Multicast Coordination Entity (MCS) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
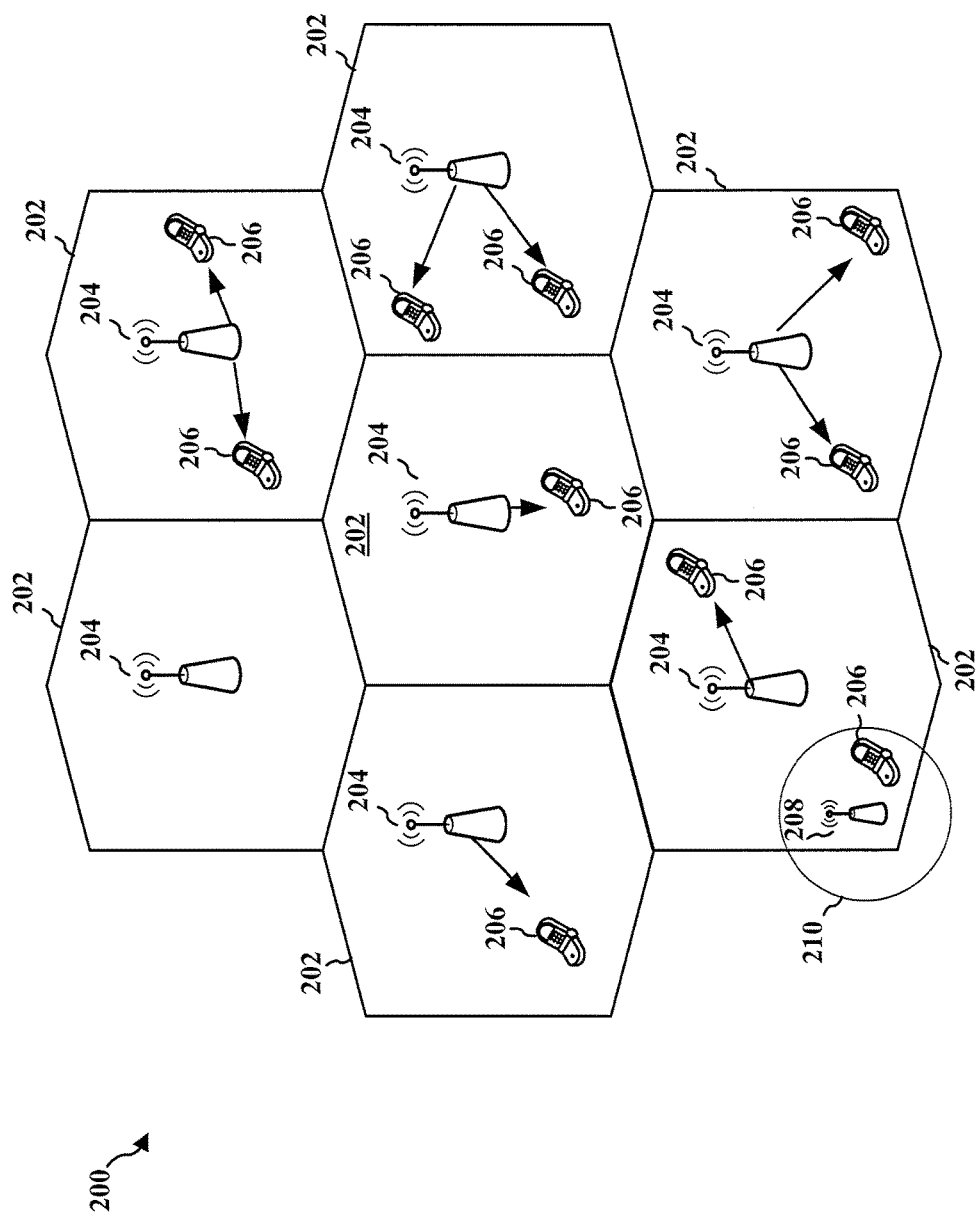
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
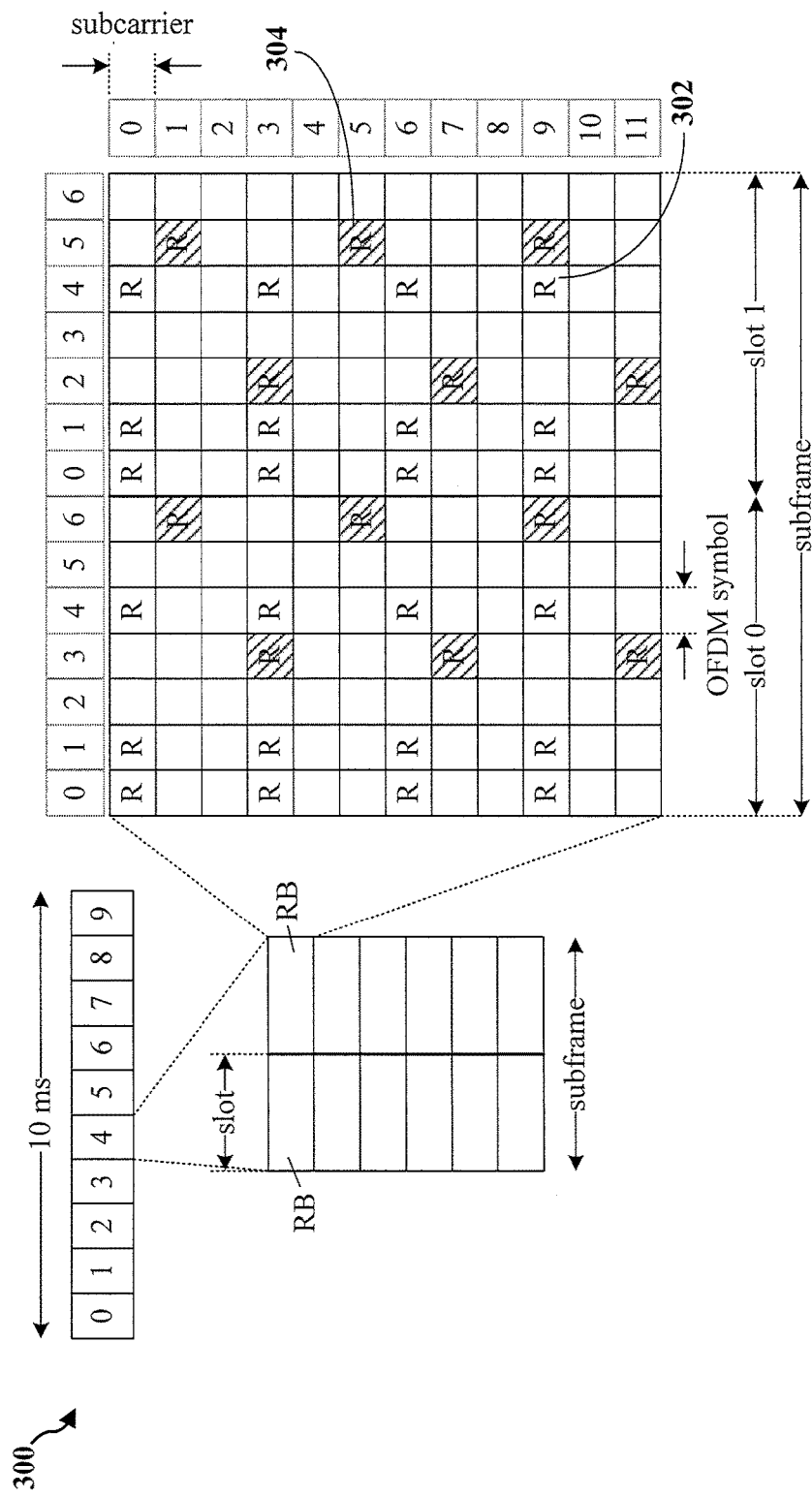
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
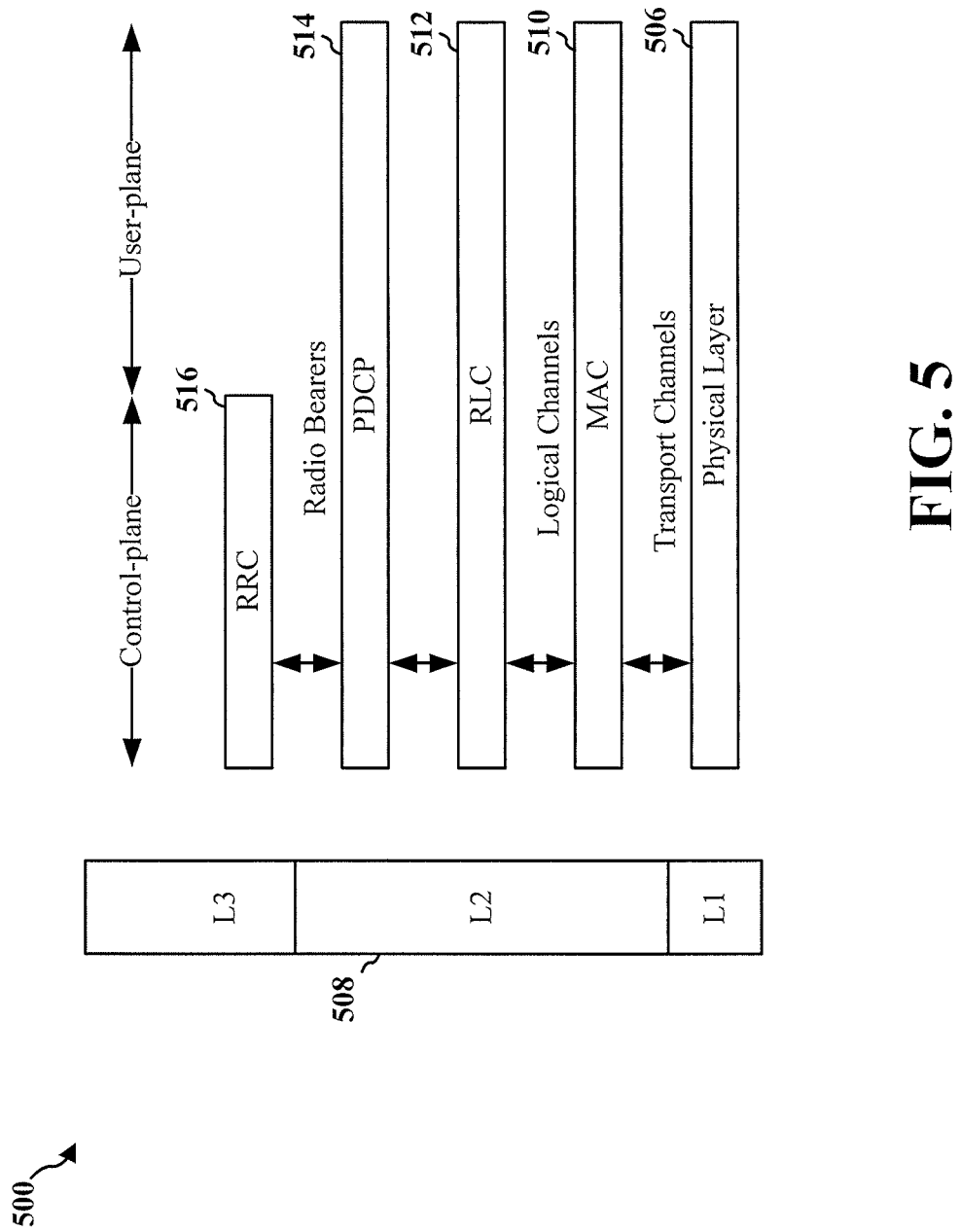
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
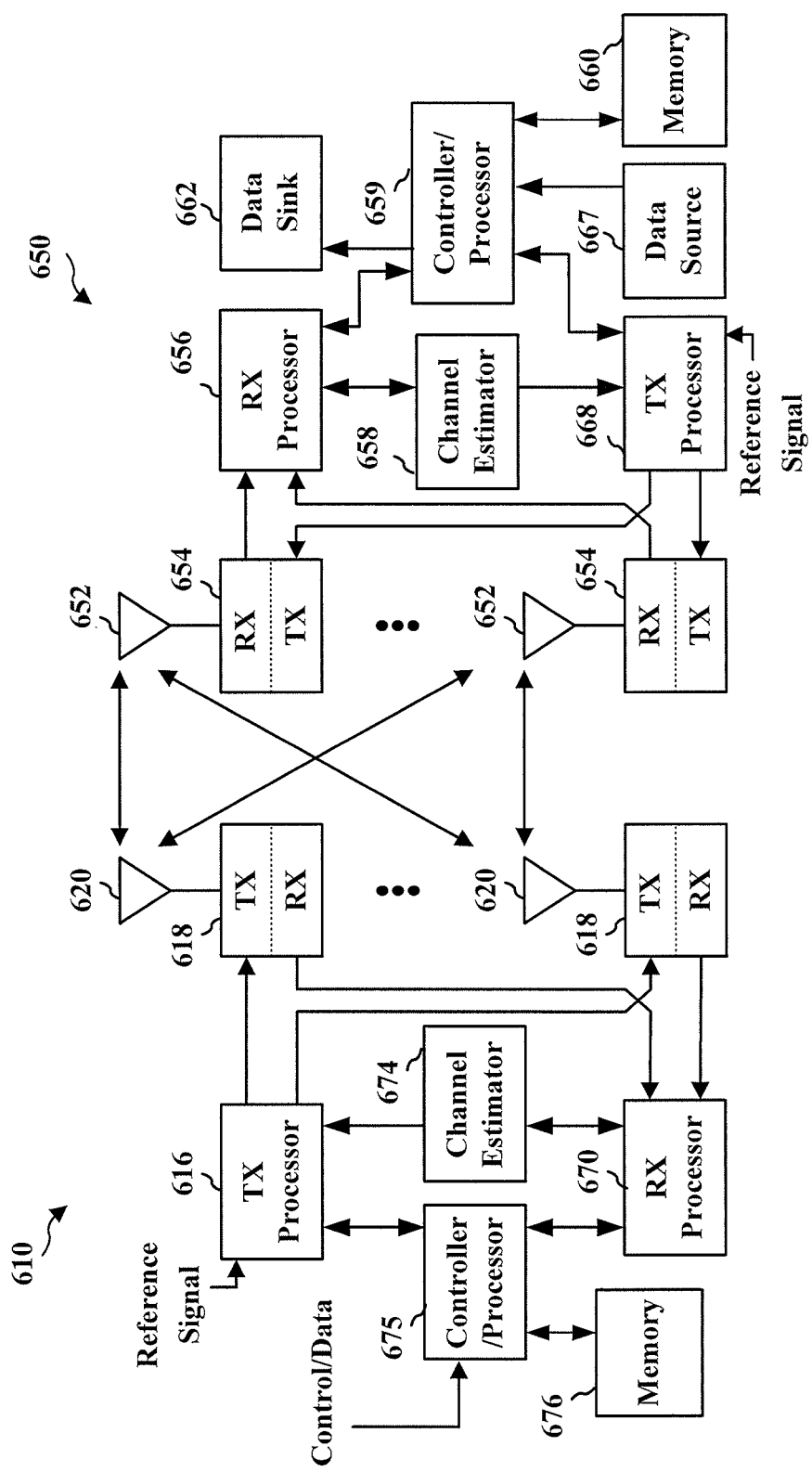
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Interference suppression or cancellation may improve link/system performance. The interference may come from a reference signal, such as a common reference signal (CRS), a channel state information reference signal (CSI-RS), a demodulation reference signal (DMRS), a positioning reference signal (PRS), a primary synchronization signal (PSS), a secondary synchronization signal (SSS). Interference may also come from control channel transmissions, such as physical control format indicator channel (PCFICH), physical hybrid-ARQ indicator channel (PHICH), physical downlink control channel (PDCCH), evolved PDCCH (ePDCCH), physical broadcast channel (PBCH), etc, transmission and/or data channel transmissions, such as physical downlink shared channel (PDSCH) transmissions.

Figure 7:
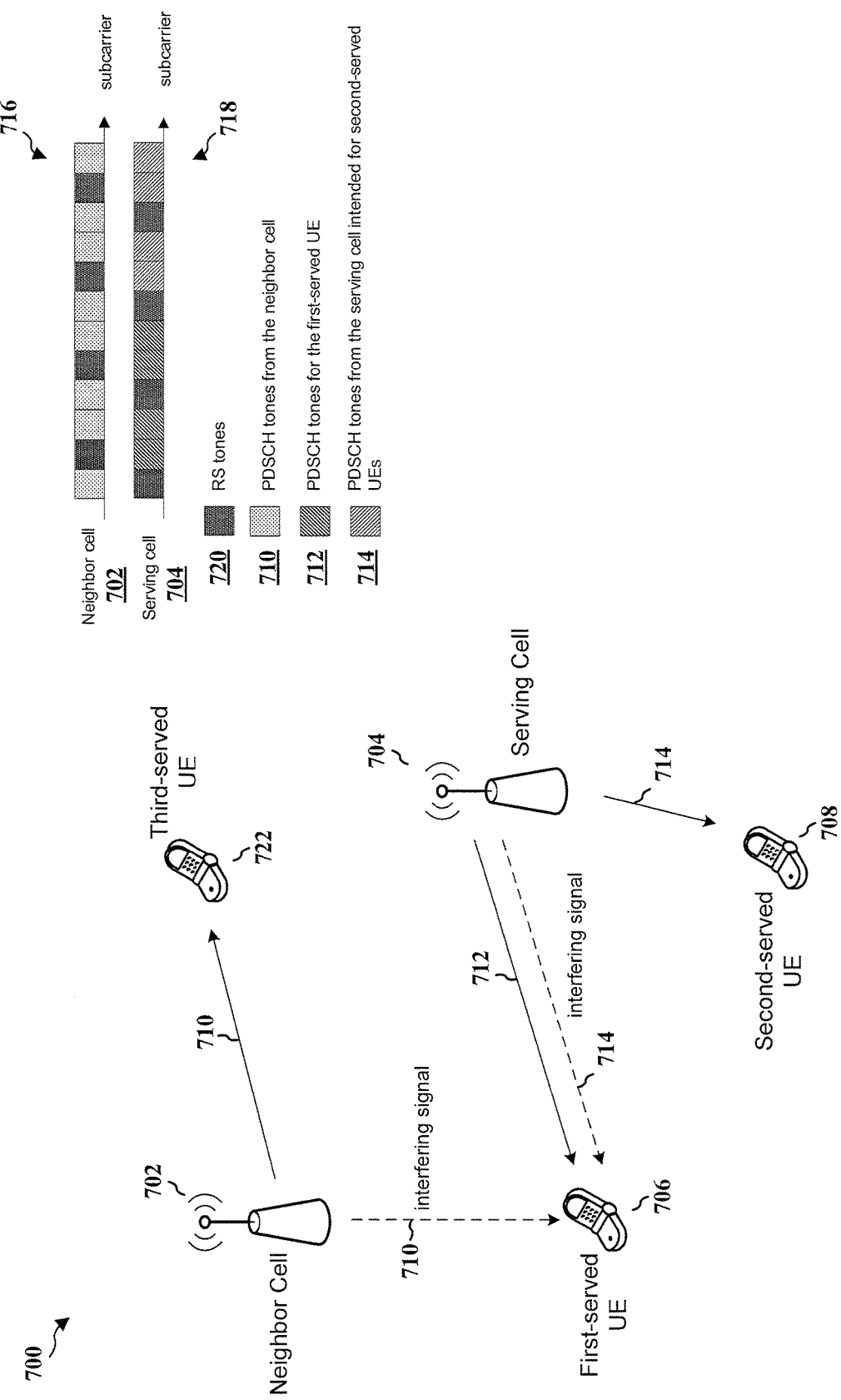
FIG. 7 is a diagram illustrating signal interference at a first-served UE resulting from signals from a serving cell and signals from a neighbor cell.

FIG. 7 is a diagram 700 illustrating signal interference involving a serving cell 704 that serves a first-served UE 706 and second-served UE 708, and a neighbor cell 702 that serves a third-served UE 722. Example resource-element diagrams 716, 718 for signal transmissions from the neighbor cell 702 and serving cell 704 are illustrated. The upper resource-element diagram 716 for neighbor cell 702 indicates the relative transmissions of reference signal (RS) tones 720 from the neighbor cell and PDSCH tones 710 from the neighbor cell. The lower resource-element diagram 718 for serving cell 704 indicates the relative transmissions of reference signal (RS) tones 720 from the serving cell, and PDSCH tones 712 from the serving cell that are intended from the first-served UE 706 and PDSCH tones 714 from the serving cell that are intended for the second-served UE 708. The tones represented in the resource-element diagrams correspond to one resource element in a resource block. Entire resource blocks are not illustrated in the diagrams for ease of illustration.

In a first signal interference scenario, a serving cell 704 serves a first-served UE 706 and a neighbor cell 702 serves a third-served UE 722. The control/data 710 transmitted by the neighbor cell 702 and intended from the third-served UE 722 may overlap or collide with control/data 712 transmitted by the serving cell 704 and intended for the first-served UE. In this case, suppression of interfering transmissions 710 from the neighboring cell 702 at the first-served UE 706 improves channel estimation and decoding of the control/data 712 transmitted by the serving cell 712. Suppression of the transmission from the neighbor cell 702 may include, for example, CRS interference cancellation (IC), PDSCH IC, control channel IC, etc.)

Here, "cancellation" or "suppression" collectively represents any interference handling techniques, including cancellation, mitigation, joint detection/demodulation, iterative cancellation/detection and decoding, to name a few. A cancellation or suppression may be hard or soft cancellation. Mitigation techniques may include hard or soft puncturing. Joint detection/demodulation techniques may include maximum likelihood (ML) demodulation or reduced complexity ML demodulation, to name a few.

In another signal interference scenario, a serving cell 704 serves a first-served UE 706 and second-served UE 708. The control/data 714 intended for the second-served UE 708 overlaps or collides with the control/data 712 intended for the first-served UE 706. In this case, suppression of interfering control/data transmissions 714 from serving cell 704 intended for the second-served UE 708 may improve link/system performance for the first-served UE 706. The foregoing may occur, for example, in multi-user multiple input multiple out operation.

Even if the control/data 714 transmitted by the serving cell 704 and intended for the second-served UE 708 does not overlap with the control/data 712 transmitted by the serving cell and intended for the first-served UE 706, link/system performance for the first-served UE may be improved by canceling control/data transmission from the serving cell 704 intended for the second-served UE 708. For example, as noted above in the first interference scenario, in order for the first-served UE 706 to receive control/data 712 transmissions intended for the first-served UE, it may be desirable to perform interference suppression with respect to the neighbor cell 702. However, in order to perform interference suppression with respect to the transmissions from the neighbor cell 702, the channel of the neighbor cell first needs to be estimated. Channel estimation of the neighbor cell 702 is based on the RS tones 720 of the neighbor cell. If the RS tones 720 of the neighbor cell 702 are interfered by the control/data transmission 714 from the serving cell 704 intended for the second-served UE 708, channel estimation of the neighbor cell 702 may be inaccurate With reference to FIG. 7, from the alignment of the RS tones 720 in the resource-element diagrams 716, 718 it is noted that the RS tones 720 of the neighboring cell 702 collide with control/data tones 712 from the serving cell 704 that are intended for the first-served UE 706 and control/data tones 714 from the serving cell that are intended for the second-served UE 708. As such, in order to obtain an accurate channel estimation of the neighbor cell 702, the colliding control/data tones 712, 714 from the serving cell 704 should be canceled at the first-served UE 706. Once an accurate channel estimation of the neighbor cell 702 is obtained, the first-served UE 706 may perform interference suppression of the neighbor cell transmissions 710.

Regarding suppression of the colliding control/data tone 712, 714, the first-served UE 706 is aware of the scheduling information for its own control/data 712. For example, the scheduling information may be obtained from PDCCH decoding. Based on its knowledge of control/data 712 transmissions, the first-served UE 706 can suppress these transmission. The first-served UE 706, however, does not know the scheduling information for the control/data 714 transmissions of the serving cell that are intended for second-served UEs 708. As a result, it is difficult for the first-served UE to suppress these transmissions. This is especially the case for PDSCH transmissions.

Disclosed herein are embodiments for providing scheduling information of a serving cell 704, including the scheduling information for transmissions of control/data intended for second-served UEs 708 served by the serving cell. A use case of these embodiments is to aid suppression of control/data transmissions 714 from the serving cell 704 to second-served UEs 708. The control/data channels may include PCFICH, PDCCH, ePDCCH and PHICH, etc.

In a first embodiment, the scheduling information of transmissions 714 intended for second-served UEs 708 may be conveyed to the first-served UE 706 through a special PDCCH or ePDCCH. Here, the actual content of the scheduling information may be conveyed to the first-served UE in the contents of the PDCCH or ePDCCH. To this end, a indication may be included in the PDCCH or ePDCCH, such as a new downlink control information (DCI) format may be used and/or radio network temporary identifiers (RNTI) values, to indicate the inclusion of scheduling information in the PDCCH or ePDCCH. If the UE detects a PDCCH or ePDCCH with the indication, the UE knows the contents of the PDCCH or ePDCCH is for purposes of providing scheduling information of transmissions intended for second-served UEs.

In a second embodiment, scheduling information of transmissions 714 intended for second-served UEs 708 may be conveyed to the first-served UE 706 by PDSCH. Here, the actual content of the scheduling information may be conveyed to the UE in the contents of the PDSCH. This embodiment may be of particular use when the amount of scheduling information is large. A special PDCCH or ePDCCH is used for scheduling the PDSCH. For example, a PDCCH or ePDCCH may inform the UE 706 that an upcoming PDSCH carries scheduling information. To this end, as with the first embodiment, a new DCI format could be introduced and/or some RNTI values could be reserved for this purpose. The PDSCH may be broadcast.

Multiple PDCCHs, ePDCCHs and/or PDSCHs conveying scheduling information as in the first and second embodiment may be transmitted by an eNB in the serving cell 704.

One PDSCH may contain one or multiple scheduling information. For example, one PDSCH may contain scheduling information of multiple UEs served in the serving cell 704. For another example, one PDSCH may contain multiple scheduling information, each of which is intended to be used by each UE, or group of UEs, in the serving cell.

In variations of the first and second embodiments, scheduling information may be conveyed every instance, for example, every subframe, and may be valid for that instance. Each scheduling information conveyed may be valid, i.e., "sticky", for a period of time during which the scheduling information does not change. The validation period may be specified as a number of subframes. The validation period may have a start time corresponding to the time of receipt of the scheduling information and end time corresponding to receipt of a signal that explicitly ends or releases the use of the scheduling information. The validation period may continue until it is updated by receipt of a next scheduling information (similar to semi-persistent scheduling). This is mainly intended to save overhead. This could be because either the second-served UE PDSCH transmission utilizes semi-persistent scheduling (SPS), or the second-served UE PDSCH transmission may not be based on SPS, but the scheduling parameters used by the serving cell do not change over a period of time.

Some part of the scheduling information conveyed may be valid for the instance, and some other part of scheduling information may remain sticky—either by implicitly or by explicit sticky/non-sticky tag in each field.

Multiple sets of scheduling information may be signaled to the UE 706 by higher layer signaling in advance (e.g. semi-statically via RRC), and an index to the set is conveyed at each instance (e.g. subframe). Here the eNB sends the scheduling information to the UE in the form of an index. The UE determines the scheduling information from the index based on a predefined mapping of indices to scheduling information. Below is an example illustration of a table of indices and corresponding scheduling information for PDSCH, where SFBC is space-frequency block code and LCDD is large delay cyclic delay diversity.

| Scheduling information for PDSCH (for illustration purpose) | | | |
|---|---|---|---|
| Index | RB allocation | Spatial scheme | MCS |
| 0 | none | — | — |
| 1 | all | SFBC for all RBs | QPSK for all RBs |
| 2 | {0, 3, 5, 6, ...} | SFBC for RBs a, b, c<br>LCDD for RBs x, y, z | QPSK for RBs a, b, c<br>16QAM for RBs x, y, z |
| ... | ... | ... | ... |

In the first and second embodiments, the scheduling information may contain, but is not limited to: RB allocation, resource allocation type, rank indication (RI), precoding matrix indicator (PMI), transmission scheme, modulation and coding scheme (MCS), modulation order; HARQ index, redundancy version (RV), new data indicator (NDI), power level; RS-type, transmission type (ePDCCH or PDSCH), DMRS scrambling; starting symbol index; virtual cell ID; rate matching information.

In the first and second embodiments, the scheduling information conveyed by PDCCH, ePDCCH, or PDSCH may contain partial information. For example, the scheduling information may contain the indication of the presence/absence of a serving cell's PDSCH transmission for each physical resource block, and/or a serving cell's control transmission for each resource element group.

In a third embodiment, in order to reduce overhead, PDSCH may carry a semi-static transmission characteristics of the serving cell 704, instead of conveying all of the details of scheduling information. For example, instead of conveying the instantaneous traffic to pilot ratio in the scheduling information, the eNB may convey to the UE a valid set of traffic to pilot ratios. The UE 706 may be informed of such PDSCH using special PDCCH for scheduling such PDSCH. In this case, a new DCI format or reserved RNTI values may used as described above with respect to the second embodiment. The PDSCH may also be broadcast. Alternatively, the semi-static transmission characteristics of the serving cell may be conveyed via RRC signaling or in a SIBx (either an existing SIBx or a new SIBx). Note that an RRC signaling or a SIB is carried by PDSCH.

The transmission characteristics carried by PDSCH may include, but are not limited to, restrictions in scheduling, for example: a set of traffic to pilot ratio (TPR) values used, transmission scheme or modulation restrictions, resource allocation type restrictions, a set of possible DCI sizes or formats, a set of possible RNTIs and virtual cell IDs used. Here, the serving base station provides the UE a set/range of values for one or more of the foregoing transmission characteristics. This may improve blind detection by the UE by limiting the potential values to a restricted set.

In a fourth embodiment, a set of RNTI values are provided to the UE. The RNTI values typically correspond to C-RNTI values assigned to second-served UEs in the cell. By providing the RNTI values to the UE, the UE is able to decode and cancel PDCCH of the second-served UEs and obtain scheduling information for PDSCH.

If scheduling information for transmissions of control/data intended for second-served UEs 708 served by the serving cell is not provided, or if such scheduling information is partially provide, via e.g. in the form of transmission characteristics as in the third embodiment, the first-served UE 706 may employ blind detection techniques to detect unknown scheduling parameters. This however may come at the cost of increased complexity and potentially reduced performance due to inaccurate detection.

Figure 8:
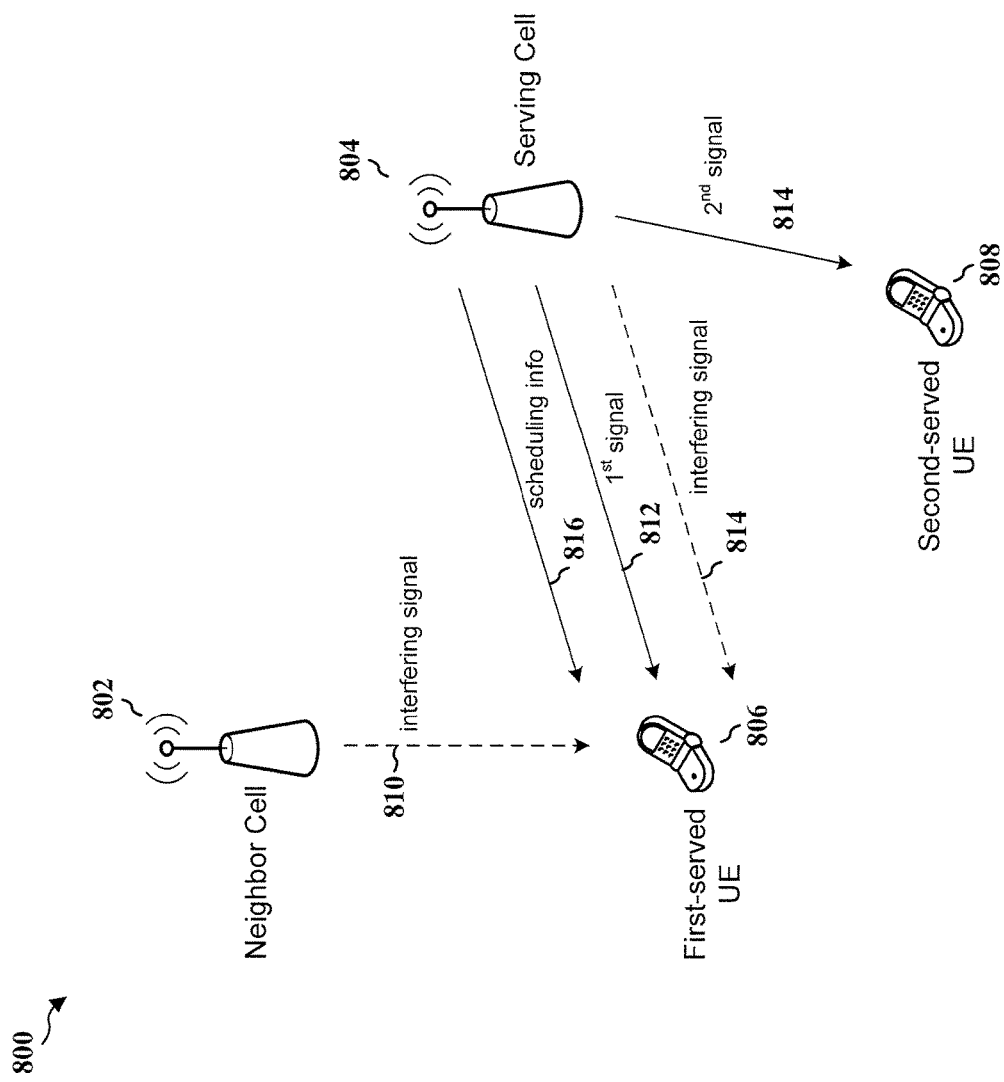
FIG. 8 is a diagram illustrating an exemplary method of suppression of interference at a first-served UE due to signals from a serving cell.

FIG. 8 is a diagram 800 illustrating an exemplary method of suppression of interference at a first-served UE 806 due to signals from a serving cell 804. A first-served UE 806 receives scheduling information 816 for the serving cell 804. The scheduling information 816 is for at least one second-served UE 808 served by the serving cell 804. The first-served UE 806 receives a signal 812/814. The received signal includes a first signal 812 intended for the first-served UE 806 and a second signal 814 intended for the at least one second-served UE 808.

The first-served UE 806 suppresses interference by the second signal 814 prior to or during channel estimation of a neighboring cell 802. Channel estimation of the neighboring cell is performed in order to suppress interference at the UE 806 due to signals 810 transmitted by the neighboring cell 802. The interference suppression of the second signal 814 is based on the received scheduling information 816. The first-served UE 806 may suppress interference by suppressing the transmission of control or data channels 814 from the serving cell 804 to the at least one second-served UE 808. The control channels may include one or more of PCFICH, PDCCH, ePDCCH and physical hybrid automatic repeat request indicator channel (PHICH).

In one configuration, the first-served UE 806 receives the scheduling information in PDCCH or evolved ePDCCH with a downlink control information (DCI) format. The DCI format may be a DCI format dedicated for providing interference cancelation of the second signal 814. The first-served UE 806 may receive a set of radio network temporary identifiers (RNTIs) through radio resource control (RCC) signaling, where the set of RNTIs is from a set of unicast RNTIs. The first-served UE 806 may decode the scheduling information based on an RNTI of the set of RNTIs.

In another configuration, the scheduling information includes a PDCCH that includes information for canceling a PDSCH received from the serving cell. In yet another configuration, the scheduling information includes a PDCCH that includes information for canceling a plurality of PDSCHs. The plurality of PDSCHs may be from the serving cell. In another configuration, the scheduling information includes a PDCCH that includes information for scheduling a PDSCH to be received from the serving cell, and the PDSCH further includes the scheduling information.

Figure 9:
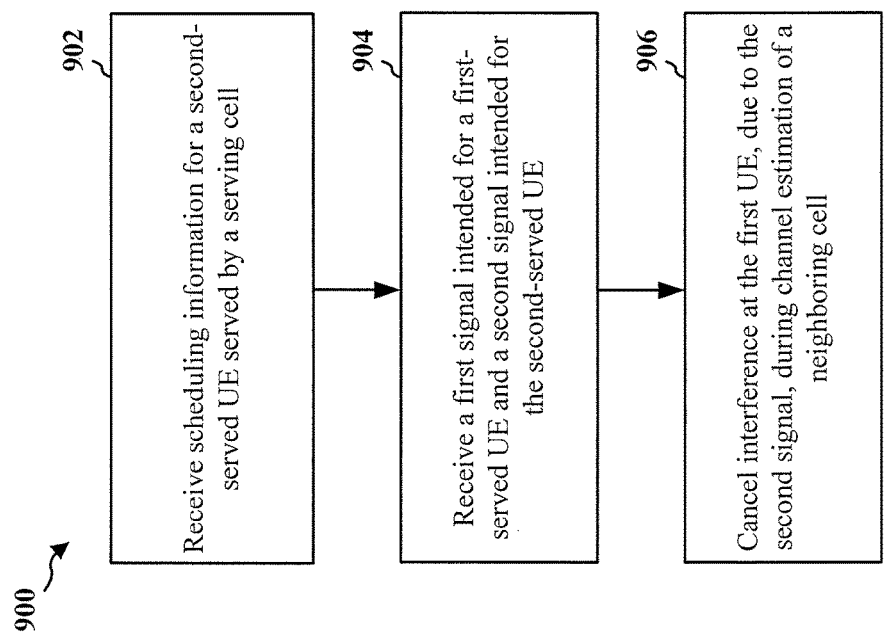
FIG. 9 is a flow chart of a method of wireless communication at a UE for suppressing interference at the UE due to signals from a serving cell.

FIG. 9 is a flow chart 900 of a method of wireless communication of a first-served UE served by a serving cell. At step 902, the first-served UE receives scheduling information for the serving cell. The scheduling information is for at least one second-served UE served by the serving cell. The scheduling information may be received in a physical downlink control channel (PDCCH) or evolved PDCCH (ePDCCH). The PDCCH or the ePDCCH may be received using a DCI format dedicated for providing interference cancelation of the second signal. Receiving scheduling information may include receiving a set of radio network temporary identifiers (RNTIs) through radio resource control (RCC) signaling, the set of RNTIs being from a set of unicast RNTIs, and the PDCCH or the ePDCCH is received using an RNTI of the set of RNTIs. The scheduling information may include information for canceling a PDSCH received from the serving cell, or information for canceling a plurality of PDSCHs.

At step 904, the first-served UE receives a signal. The received signal includes a first signal intended for the first-served UE and a second signal intended for the at least one second-served UE. For example, the first signal and the second signal may be non-overlapping signals. For another example, the first signal and the second signal may be overlapping signals transmitted via a MU-MIMO method.

At step 906, the first-served UE suppresses interference by the second signal prior to or during a channel estimation procedure. The interference suppression of the second signal is based on the received scheduling information. Interference suppression of the second signal may include suppressing the transmission of control or data channels from the serving cell to the at least one second-served UE. The control channels include one or more of PCFICH, PDCCH, ePDCCH and PHICH. Interference cancellation or suppression of the second signal may be performed using a technique intended to reduce/mitigate the impact of interference, such as hard cancellation, soft cancellation, hard or soft puncturing, joint demodulation or detection such as ML, iterative cancellation, detection, and decoding.

The channel estimation procedure may correspond to a channel estimation of a neighboring cell that is used in suppressing interfering transmissions coming from the neighboring cell. Interference cancellation or suppression of transmission from the neighboring cell may be performed using a technique intended to reduce/mitigate the impact of interference and includes techniques such as hard cancellation, soft cancellation, hard or soft puncturing, joint demodulation or detection such as ML, iterative cancellation, detection, and decoding. The channel estimation procedure may correspond to a channel estimation of a serving cell.

In one implementation, the step of receiving scheduling information may include receiving a PDCCH or a ePDCCH that contains scheduling information for a PDSCH intended to the second-served UE, wherein the PDSCH contains scheduling information for second-served UEs. In another implementation, the step of receiving scheduling information may include receiving a set of RNTIs, decoding a PDCCH or a ePDCCH intended for second-served UEs using the RNTIs, and obtaining the scheduling information for second-served UEs from the decoded PDCCH or the decoded ePDCCH.

Figure 10:
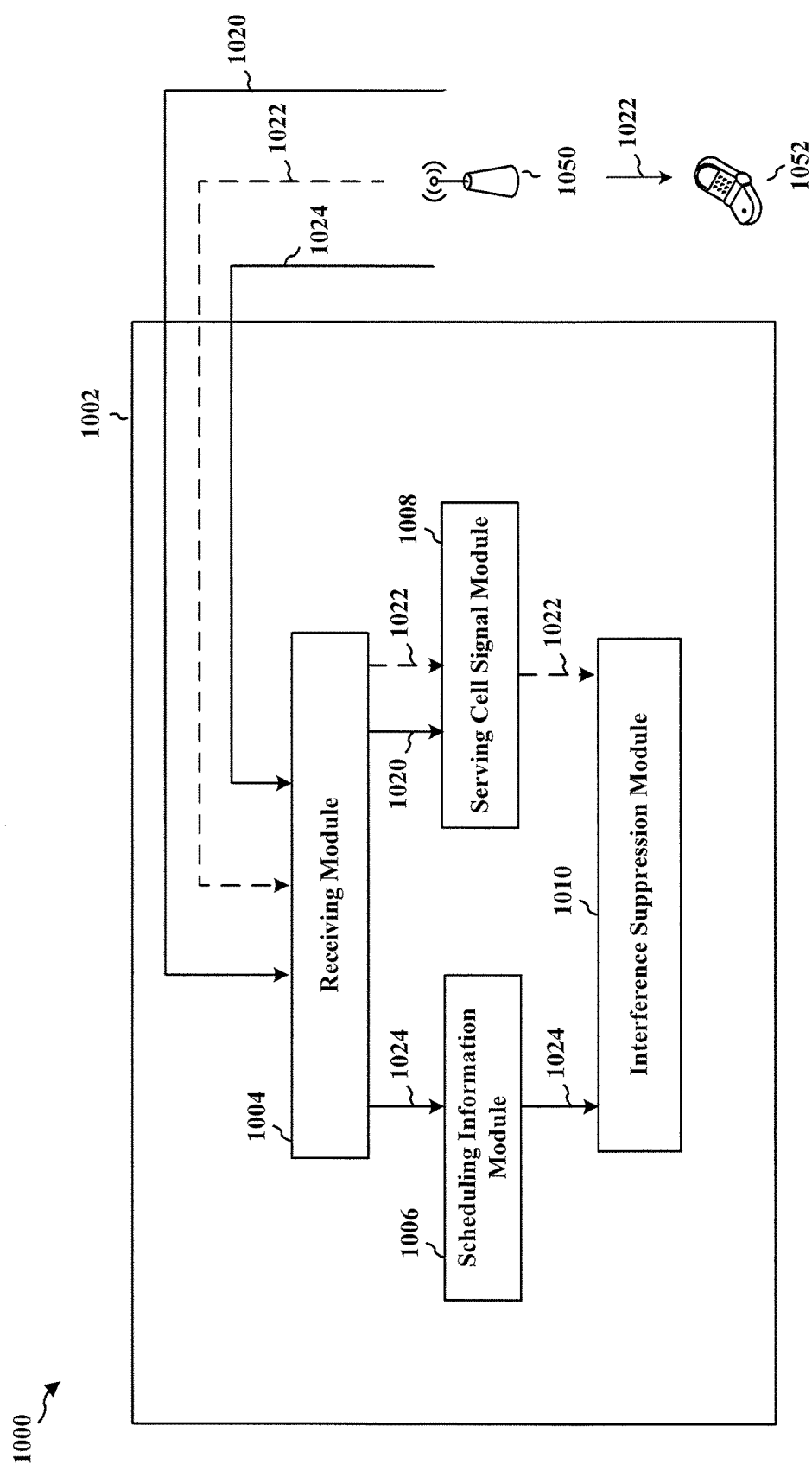
FIG. 10 is a conceptual data flow diagram illustrating the data flow between different modules/means/components in an exemplary apparatus that implements the method of FIG. 9.

FIG. 10 is a conceptual data flow diagram 1000 illustrating the data flow between different modules/means/components in an exemplary apparatus 1002. The apparatus may be a UE, e.g., a first-served UE as shown in FIG. 8. The first-served UE 1002 includes a receiving module 1004, a scheduling information module 1006, a serving cell signal module 1008, and an interference suppression module 1010.

The receiving module 1004 receives signals 1020, 1022, 1024 from a serving cell 1050 serving the apparatus 1002 and a second-served UE 1052. The received signals 1020, 1022 1024 may be related to scheduling information or serving cell signals. Serving cell signals may be control/data signals 1020 intended for the first-served UE 1002 and interfering control/data signals 1022 intended for second-served UE 1052. Scheduling information signals 1024 may include scheduling information for the second-served UE 1052.

Scheduling information signals 1024 are provided to the scheduling information module 1006 that receives scheduling information for a serving cell serving the apparatus. AS mentioned above, the scheduling information is for the second-served UE 1052 served by the serving cell 1050. Serving cell signals 1020, 1022 received by the receiving module 1004 are provided to the serving cell signal module 1008. As mention above, the received signal includes a first signal 1020 intended for the first-served UE 1002 UE and a second signal 1022 intended for the at least one second-served UE 1052.

The interference suppression module 1010 cancels interference by the second signal 1022 during channel estimation of a neighboring cell (not shown). Interference suppression by the interference suppression module 1010 is based on the received scheduling information 1024.

The apparatus may include additional modules that perform each of the steps of the algorithm in the aforementioned flow chart of FIG. 9. As such, each step in the aforementioned flow charts of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
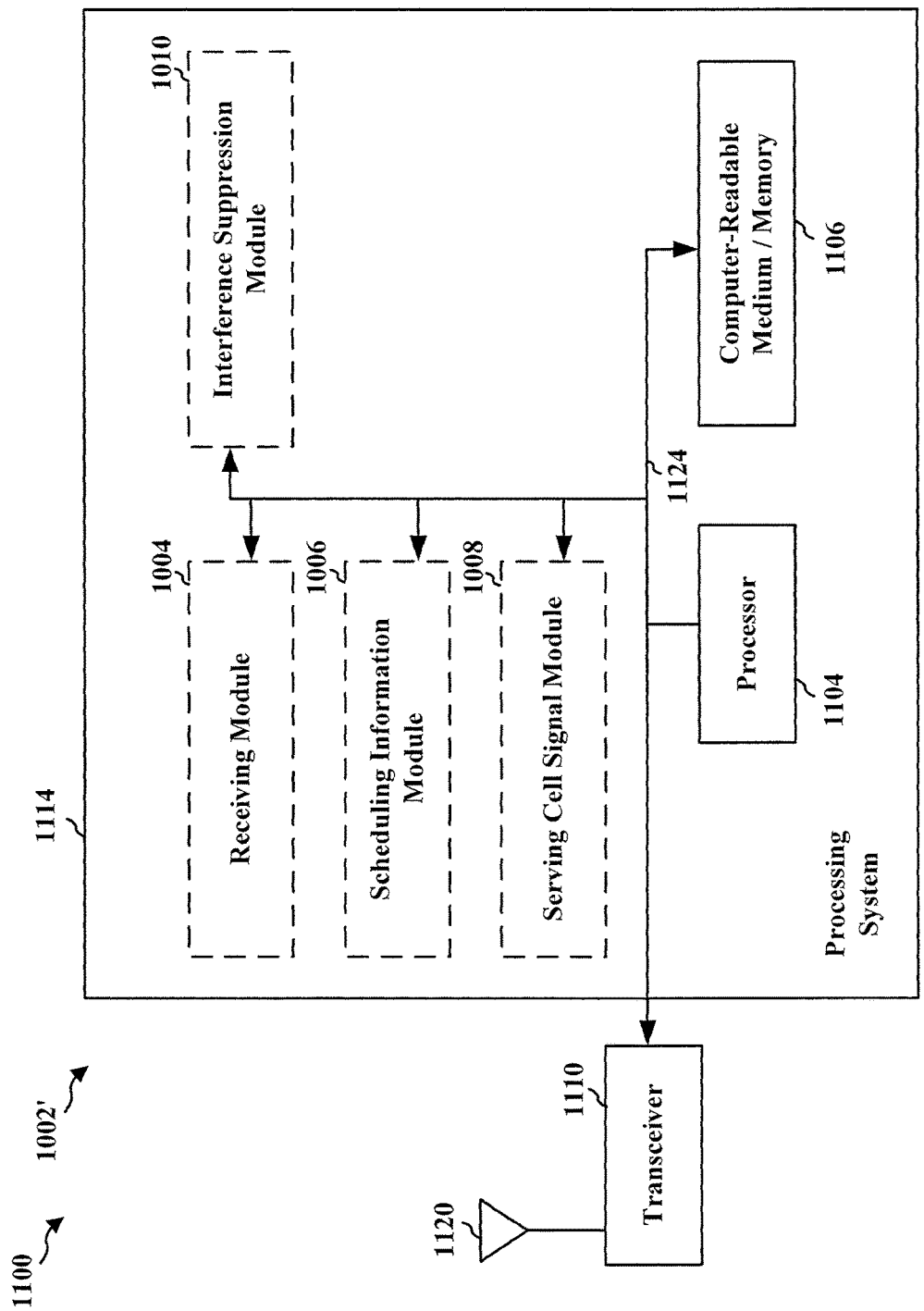
FIG. 11 is a diagram illustrating an example of a hardware implementation for an apparatus employing a processing system that implements the method of FIG. 9.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiving module 1004. In addition, the transceiver 1110 receives information from the processing system 1114, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008 and 1010. The modules may be software modules running in the processor 1104, resident/stored in the computer readable medium/memory 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for receiving scheduling information for a serving cell serving the apparatus. The scheduling information is for at least one second-served UE served by the serving cell. The apparatus 1002/1002' also includes means for receiving a signal that includes a first signal intended for the apparatus and a second signal intended for the at least one second-served UE. The apparatus 1002/1002' further includes means for suppressing interference by the second signal during channel estimation of a neighboring cell, the interference suppression being based on the received scheduling information.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a first-served user equipment (UE) served by a serving cell, comprising:
   detecting a downlink control information (DCI) format in a physical downlink control channel (PDCCH) or an evolved PDCCH (ePDCCH) conveyed to the UE from the serving cell, the DCI format indicating that the PDCCH or the EPDCCH comprises scheduling information for at least one second-served UE served by the serving cell;
   decoding the PDCCH or the ePDCCH and obtaining the scheduling information for the at least one second-served UE when the DCI format is detected;
   receiving a signal, the received signal comprising a first signal intended for the first served UE and a second signal intended for the at least one second-served UE; and
   canceling interference by the second signal from the serving cell for the at least one second served UE prior to or during a channel estimation procedure, the interference cancelation being based on the obtained scheduling information for the at least one second-served UE.

2. The method of claim 1, wherein canceling interference by the second signal comprises suppressing the transmission of control or data channels from the serving cell to the at least one second-served UE.

3. The method of claim 2, wherein the control channels include one or more of physical control format indicator channel (PCFICH), physical downlink control channel (PDCCH), evolved PDCCH (ePDCCH) and physical hybrid automatic repeat request indicator channel (PHICH).

4. The method of claim 1, wherein the channel estimation procedure further comprises performing a channel estimation of a neighboring cell with interference suppression of the second signal from the serving cell for the at least one second served UE based on the obtained scheduling information for the at least one second-served UE, and
   the method further comprises canceling interfering transmissions from the neighboring cell based on the channel estimate.

5. The method of claim 1, wherein the channel estimation procedure is for one of the serving cell or a neighboring cell.

6. The method of claim 1, wherein the first signal and the second signal are overlapping signals transmitted via a multi-user multiple input multiple output (MU-MIMO) method.

7. The method of claim 1, wherein the scheduling information includes information for canceling a PDSCH received from the serving cell.

8. The method of claim 1, wherein the scheduling information includes information for canceling a plurality of PDSCHs.

9. The method of claim 1, wherein the scheduling information is for a PDSCH intended for the UE, and wherein the PDSCH contains scheduling information for the at least one second-served UE.

10. A first-served user equipment (UE) served by a serving cell, comprising:
    a memory; and
    at least one processor coupled to the memory and configured to:
        detect a downlink control information (DCI) format in a physical downlink control channel (PDCCH) or an evolved PDCCH (ePDCCH) conveyed to the UE from the serving cell, the DCI format indicating that the PDCCH or the EPDCCH comprises scheduling information for at least one second-served UE served by the serving cell;
        decode the PDCCH or the ePDCCH and obtain the scheduling information for the at least one second-served UE when the DCI format is detected;
        receive a signal, the received signal comprising a first signal intended for the apparatus and a second signal intended for the at least one second-served UE; and
        cancel interference by the second signal from the serving cell for the at least one second served UE prior to or during a channel estimation procedure, the interference cancellation being based on the obtained scheduling information for the at least one second-served UE.

11. The first-served UE of claim 10, wherein the at least one processor is configured to suppress interference by the second signal by canceling the transmission of control or data channels from the serving cell to the at least one second-served UE.

12. The first-served UE of claim 11, wherein the control channels include one or more of physical control format indicator channel (PCFICH), physical downlink control channel (PDCCH), evolved PDCCH (ePDCCH) and physical hybrid automatic repeat request indicator channel (PHICH).

13. The first-served UE of claim 10, wherein the channel estimation procedure further comprises performing a channel estimation of a neighboring cell with interference suppression of the second signal from the serving cell for the at least one second served UE based on the obtained scheduling information for the at least one second-served UE, and
    the at least one processor is further configured to cancel interfering transmissions from the neighboring cell based on the channel estimate.

14. The first-served UE of claim 10, wherein the channel estimation procedure is for one of the serving cell or a neighboring cell.

15. The first-served UE of claim 10, wherein the first signal and the second signal are overlapping signals transmitted via a multi-user multiple input multiple output (MU-MIMO) apparatus.

16. The first-served UE of claim 10, wherein the scheduling information includes information for canceling a PDSCH received from the serving cell.

17. The first-served UE of claim 10, wherein the scheduling information includes information for canceling a plurality of PDSCHs.

18. The first-served UE of claim 10, wherein the scheduling information is for a PDSCH intended to the UE, and wherein the PDSCH contains scheduling information for second-served UEs.

19. A first-served user equipment (UE) served by a serving cell, comprising:
    means for detecting a downlink control information (DCI) format in a physical downlink control channel (PDCCH) or an evolved PDCCH (ePDCCH) conveyed to the UE from the serving cell, the DCI format indicating that the PDCCH or the EPDCCH comprises scheduling information for at least one second-served UE served by the serving cell;
    means for decoding the PDCCH or the ePDCCH and obtaining the scheduling information for the at least one second-served UE when the DCI format is detected;

means for receiving a signal, the received signal comprising a first signal intended for the apparatus and a second signal intended for the at least one second-served UE; and means for canceling interference by the second signal from the serving cell for the at least one second served UE prior to or during a channel estimation procedure, the interference cancelation being based on the obtained scheduling information for the at least one second-served UE.

20. The apparatus of claim 19, wherein the means for canceling interference by the second signal is configured to suppress the transmission of control or data channels from the serving cell to the at least one second-served UE.

21. The apparatus of claim 19, wherein the channel estimation procedure further comprises performing a channel estimation of a neighboring cell with interference suppression of the second signal from the serving cell for the at least one second served UE based on the obtained scheduling information for the at least one second-served UE, and the apparatus further comprises means for canceling interfering transmissions from the neighboring cell based on the channel estimate.

22. A non-transitory computer-readable medium of a first-served user equipment (UE) served by a serving cell, the non-transitory computer-readable medium comprising code that when executed on at least one processor causes the at least one processor to:

detect a downlink control information (DCI) format in a physical downlink control channel (PDCCH) or an evolved PDCCH (ePDCCH) conveyed to the UE from the serving cell, the DCI format indicating that the PDCCH or the EPDCCH comprises scheduling information for at least one second-served UE served by the serving cell;

decode the PDCCH or the ePDCCH and obtain the scheduling information for the at least one second-served UE when the DCI format is detected;

receive a signal, the received signal comprising a first signal intended for the first-served UE and a second signal intended for the at least one second-served UE; and cancel interference by the second signal from the serving cell for the at least one second served UE prior to or during a channel estimation procedure, the interference cancellation being based on the obtained scheduling information for the at least one second-served UE.

* * * * *